(12) United States Patent
Yoshizawa

(10) Patent No.: US 8,199,380 B2
(45) Date of Patent: Jun. 12, 2012

(54) IMAGE READING DEVICE AND METHOD FOR READING IMAGE

(75) Inventor: Motoki Yoshizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 560 days.

(21) Appl. No.: 12/410,230

(22) Filed: Mar. 24, 2009

(65) Prior Publication Data

US 2009/0251742 A1    Oct. 8, 2009

(30) Foreign Application Priority Data

Mar. 24, 2008  (JP) .................................. 2008-075316

(51) Int. Cl.
- *H04N 1/04* (2006.01)
- *H04N 1/46* (2006.01)
- *H04L 7/00* (2006.01)
- *H01L 27/00* (2006.01)

(52) U.S. Cl. ........ 358/482; 358/513; 358/505; 358/409; 358/474; 358/475; 375/355; 250/208.1

(58) Field of Classification Search .................. 358/482, 358/513, 505, 409, 474; 375/355; 250/208.1

See application file for complete search history.

(56) References Cited

U.S. PATENT DOCUMENTS

| | | | |
|---|---|---|---|
| 2008/0225344 A1* | 9/2008 | Okamoto | 358/409 |
| 2009/0059324 A1* | 3/2009 | Nagase et al. | 358/513 |

FOREIGN PATENT DOCUMENTS

JP        05-003546 A      2/1993

* cited by examiner

*Primary Examiner* — Charlotte M Baker
*Assistant Examiner* — Rury Grisham
(74) *Attorney, Agent, or Firm* — Kilpatrick Townsend & Stockton LLP

(57) ABSTRACT

An image reading device having an image sensor formed by a plurality of sensor chips is provided. The image reading device includes an AFE circuit, a clock provider and a digital data processor. The AFE circuit is configured to process analog data provided by the image sensor so as to convert the analog data into digital data and to output the digital data. The clock provider is configured to provide the image sensor with a driving clock, the clock provider configured to stop providing the driving clock for a certain period of time before the AFE circuit reads initial data provided by each of the sensor chips. The digital data processor configured to remove the digital data provided by the AFE circuit while the clock provider has stopped providing the driving clock.

19 Claims, 4 Drawing Sheets

US 8,199,380 B2

IMAGE READING DEVICE AND METHOD FOR READING IMAGE

This application claims priority to Japanese Patent Application No. 2008-075316, filed Mar. 24, 2008, the entirety of which is expressly incorporated by reference herein.

BACKGROUND

1. Technical Field

The present invention relates to an image reading device and a method for reading an image.

2. Related Art

There is a CIS (contact image sensor) scanner having an image sensor formed by a plurality of sensor chips arranged in a line in a main scanning direction. The image sensor of the scanner produces analog data including a reference portion (which may be called a "field through portion") and a data portion, and an A/D converter of the scanner produces digital data indicating a pixel value by using a difference between the reference portion and the data portion.

As opto-electric conversion elements of the sensor chips are not uniform, the reference portions of a waveform corresponding to pixels include offset differences among one another. The scanner reduces the offset differences among the pixels by performing clamping (fixing the reference portion of the waveform at a constant voltage by adding a dc component to the signal waveform).

JP A-H05-3546 discloses an example of the related art.

Among the different sensor chips, however, the offset differences may be great. If the offset differences are great, fixation of the voltage by clamping may not be able to keep up, and thus cannot reduce the offset differences enough. In such a case, quality of image data output may be degraded.

SUMMARY

An advantage of some aspects of the invention is that an image reading device can suppress an effect of the offset differences among the sensor chips.

According to an aspect of the invention, an image reading device having an image sensor formed by a plurality of sensor chips is provided. The image reading device includes an AFE circuit, a clock provider and a digital data processor. The AFE circuit is configured to process analog data provided by the image sensor so as to convert the analog data into digital data and to output the digital data. The clock provider is configured to provide the image sensor with a driving clock. The clock provider is also configured to stop providing the driving clock for a certain period of time before the AFE circuit reads initial data provided by each of the sensor chips. The digital data processor is configured to remove the digital data provided by the AFE circuit while the clock provider has stopped providing the driving clock.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described hereafter.

Figure 1:
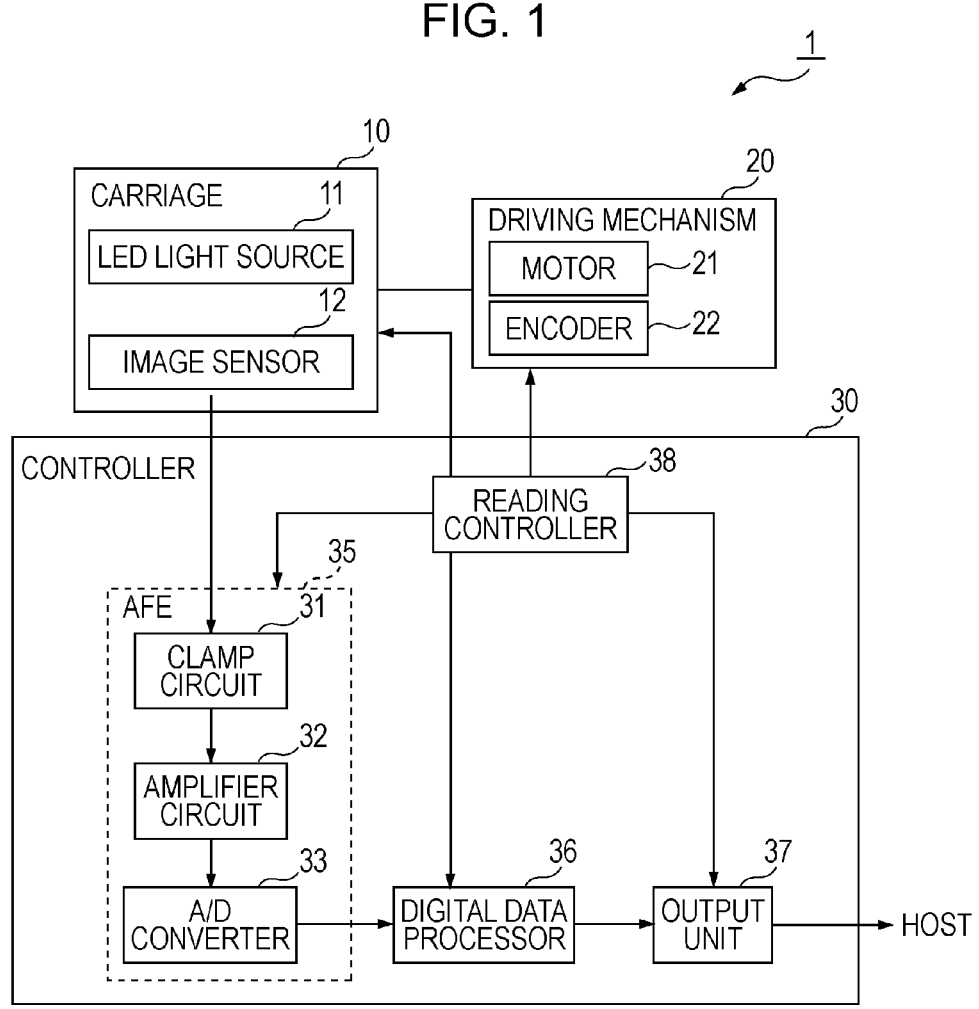
FIG. 1 is a schematic block diagram of an image reading device.

FIG. 1 is a schematic block diagram of an image reading device 1 of the embodiment of the invention.

The image reading device 1 is a flat-bed type image reading device having a document holder on an upper face of its housing. The image reading device 1 is configured to scan an image sensor 12 of a CIS (contact image sensor) system so as to read an image of a document placed on the document holder formed by a transparent plate.

The image reading device 1 has a carriage 10 including an LED light source 11 and an image sensor 12, a driving mechanism 20 for controlling a back-and-forth movement of the carriage 10, and a controller 30 configured to perform various processes for controlling the image reading device 1 and reading an image.

The image sensor 12 is configured to receive light reflected by the document, to store electrical charges corresponding to an amount of the received light, and to provide the controller 30 with a read-out signal (data).

Figure 2:
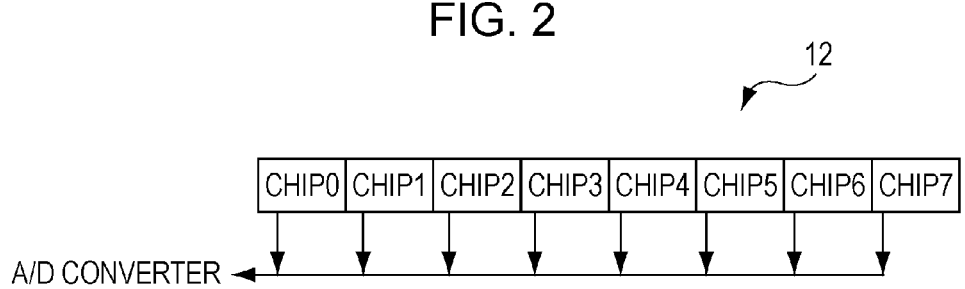
FIG. 2 illustrates a configuration of an image sensor.

FIG. 2 illustrates a configuration of the image sensor 12.

The image sensor 12 is formed of a plurality of sensor chips (Chip0, Chip1, Chip2, . . . ) arranged in a line in a main scanning direction. Each of the sensor chips has the same configuration of a CCD (charge coupled device) image sensor. That is, each of the sensor chips includes an opto-electric conversion element (photodiode), a shift gate and a shift register. The sensor chip opens the shift gate so as to transfer electric charges stored on the opto-electric conversion element to the shift register, and produces an output signal by transferring the electric charges through the shift register in order. Opening of the shift gate is controlled by a shift gate pulse. The shift register transfers the electric charges in response to an applied driving pulse (CCD clock). The transferred electric charges is converted to an electric signal (analog data) by an output portion (electric charge-voltage converter) of an end of the shift register so as to be sent to the controller 30.

As shown in FIG. 2, e.g., the above analog data is transferred to the controller 30 through the sensor chips in order from closest to the output side (in order of Chip0, Chip1, Chip2, . . . ).

Referring back to FIG. 1 for continued explanation, the carriage 10 is configured to carry the image sensor 12 together with the LED light source 11 in a sub-scanning direction. The carriage 10 is suspended on a mechanical guide, e.g., a shaft, arranged parallel to the glass face of the document holder in such a manner as to slide back and forth. The carriage 10 is pulled by a belt that is driven by rotation of a motor 21 of the driving mechanism 20, that causes the carriage 10 to move back and forth. An amount of the movement of the carriage 10 is controlled by an output value of an encoder 22 configured to output pulses in accordance with an amount of the rotation of the motor 21.

The controller 30 includes an AFE (analog front end) 35, a digital data processor 36, an output unit 37 and a reading controller 38. The AFE 35 is configured to perform an analog process. The digital data processor 36 is configured to perform various correction processes on digital data provided by the AFE 35. The output unit 37 is configured to provide a host such as a personal computer with the data provided by the digital data processor 36. The reading controller 38 is configured to control the operation of controller 30, to control the LED light source 11 and the image sensor 12 included in the carriage 10, and to control the driving mechanism 20. The reading controller 38 corresponds to a clock provider.

The AFE 35 is configured to perform an analog process on the analog data provided by the image sensor 12 so as to finally produce the digital data.

The AFE 35 includes a clamp circuit 31, an amplifier circuit 32 and an A/D converter 33. The AFE 35 may include other circuits (e.g., a DAC for offset adjustment, a low-pass filter and so on) included in the AFE configuration of ordinary scanners.

The clamp circuit 31 may be called a CDS (correlated double sampling) circuit. The clamp circuit 31 is configured to clamp and sample a reference portion and a data portion, respectively, of a waveform of the analog data that corresponds to each of pixels, and to produce a difference between the reference portion and the data portion. The clamp circuit 31 removes reset noise, and cancels an offset difference by fixing the reference portion at a constant voltage.

The amplifier circuit 32 may be called a PGA (programmable gain amplifier) circuit. The amplifier circuit 32 is configured to adjust a gain for the analog data provided by the clamp circuit 31 in accordance with a direction of the reading controller 38, so as to provide the A/D converter 33 with a signal of appropriate level.

The A/D converter 33 is configured to convert the analog data, received from A/D converter 33 into digital data, and to provide the digital data processor 36 with the digital data.

The image sensor 12 and the controller 30 are connected through a flexible cable.

The reading controller 38 is configured to control the driving mechanism 20, the rotation of the motor 21 and the movement of the carriage 10. The reading controller 38 is configured to control switching on/off of the LED light source 11.

Moreover, the reading controller 38 is configured to control one or more aspects of operation of the image sensor 12 for reading an image. That is, the reading controller 38 is configured to control a timing at which the data read by the image sensor 12 is transferred to the AFE 35. More specifically, the reading controller 38 is configured to provide the image sensor 12 with a clock signal (CCD clock) for the operation of the image sensor 12.

The reading controller 38 is configured, however, to stop providing the CCD clock for a certain period of time before each of the sensor chips of the image sensor 12 outputs the first data. That is, the reading controller 38 stops providing the clock used for reading the data after the N-th sensor chip has finished outputting the data and before the (N+1)-th sensor chip starts to output the data. By doing so, the clamp circuit 31 has enough time to clamp the reference portion. Even in a case where the offset difference is significant between the sensor chips, the reference portion of the analog data waveforms can be fixed without delay.

The above process will be specifically described with reference to the timing chart of waveforms shown in FIGS. 3A-3E. FIGS. 3A-3E are not drawn to scale but it is understood that the process is clear in light of the following descriptions.

Figure 3A:
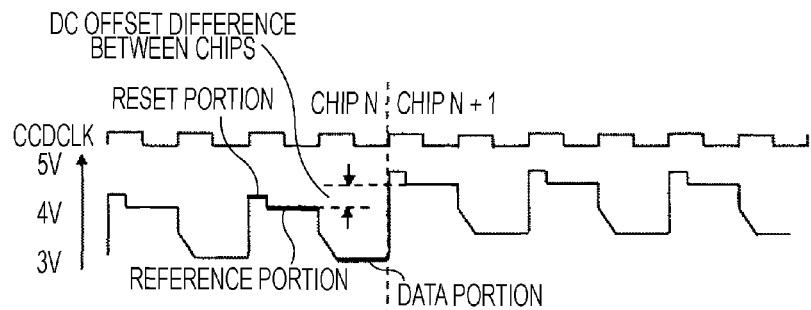
FIG. 3A is a timing chart of a clock and a CCD output waveform.

FIG. 3A shows the CCD clock (CCDCLK) and the output signal (analog data) of the image sensor 12. As shown in FIG. 3A, the waveform of the output of the image sensor 12 corresponding to each of the pixels is formed by a reset portion, the reference portion and the data portion.

Figure 3B:
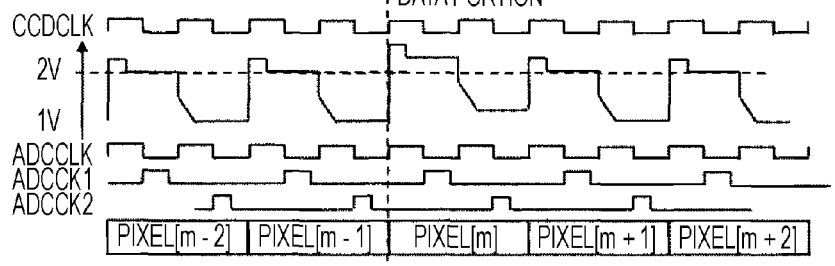
FIG. 3B is a timing chart of the clock and the CCD output waveform in a case where reference portions are clamped, and CCDCLK is not stopped.

FIG. 3B shows a waveform in a case where the clamp circuit 31 clamps the reference portions to 2V, by using a control method in which the reading controller 38 does not stop providing the CCD clock. FIG. 3B shows waveforms named ADCCLK, ADCCK1 and ADCCK 2. ADCCLK is a clock signal for driving the A/D converter 33. ADCCK1 is a clock signal for controlling timing at which the reference portions are clamped. ADCCK2 is a clock signal for controlling timing at which the data portions are sampled.

As shown in FIG. 3B, the reference portions of the data within the waveform of one sensor chip are clamped and fixed to the fixed voltage (2V) so that the offset difference can be neglected. In a case, however, where a transition to a different sensor chip occurs such as from the chip N to the chip (N+1), the reference portion of the waveform corresponding to the first pixel [m] cannot be clamped without delay and thus cannot be fixed.

Within the waveform corresponding to one sensor chip, in general, the difference between the reference portions of the pixels (offset difference) is so small that the reference portion can be clamped without delay. Between the data of different sensor chips, however, the offset difference is so significant that the reference portion cannot be clamped without delay. The digital data after A/D conversion may be affected thereby, and the image quality may be degraded.

Figure 3C:
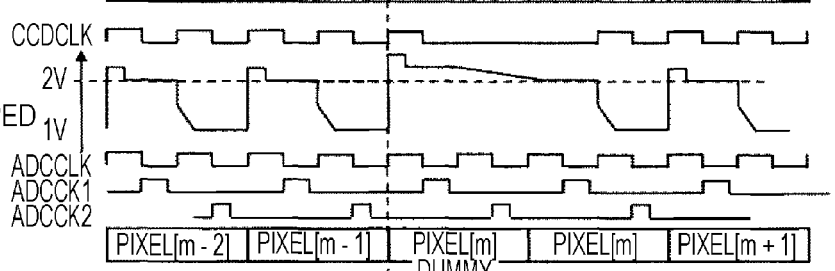
FIG. 3C is a timing chart of the clock and the CCD output waveform in a case where reference portions are clamped, CCDCLK is stopped and ADCCLK is not stopped.

Thus, the reading controller 38 of this embodiment stops providing the CCD clock for a certain period of time as shown in FIG. 3C, so that the clamp circuit 31 can have enough time to clamp the reference portion. The period of time for which the reading controller 38 stops providing the CCD clock is enough time to fix the reference portion, and is registered in advance.

The reading controller 38 of this embodiment does not stop providing the clock ADCCLK for driving the A/D converter 33 while the CCD clock is not being provided. The reason why is as follows.

Figure 3D:
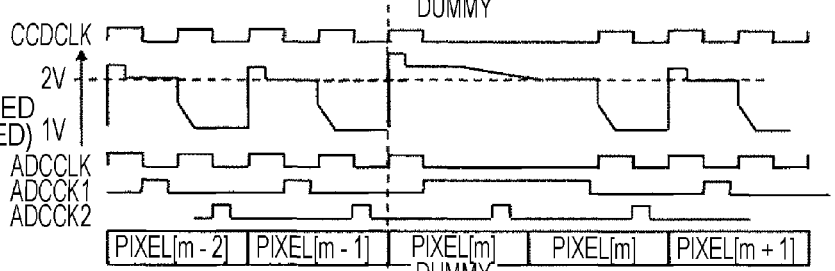
FIG. 3D is a timing chart of the clock and the CCD output waveform in a case where reference portions are clamped, CCDCLK is stopped and ADCCLK is stopped.

When the clock ADCCLK for driving the A/D converter 33 is stopped for a long period of time, as shown in FIG. 3D, the pixel just before ADCCLK is stopped (the pixel [m−1] in FIG. 3D) may produce an abnormal output. Specifically speaking, the A/D converter 33 samples and holds an input voltage so as to compare its amount of electric charge with a reference value and to produce a digital code. The electric charges being held will be reduced by leakage as time passes. This phenomenon is called a droop. If the clock is stopped halfway, the pixel being held at that time (the pixel [m−1] in FIG. 3D) takes a longer time from being held to being compared and converted than other pixels, resulting in an increase in the droop and consequently production of poor image quality. For the above reason, it is not preferable to stop the clock for driving the A/D converter 33.

Figure 3E:
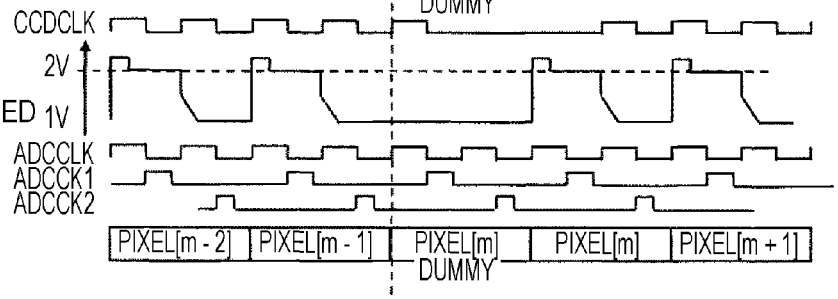
FIG. 3E is a timing chart of the clock and the CCD output waveform in a case where reference portions are clamped, and CCDCLK is stopped before a reset.

It is also not preferable to stop the CCD clock before the period of the reset portion as shown in FIG. 3E. That is because the period for clamping cannot be extended. Refer back to FIG. 1 for continued explanation.

The digital data processor 36 performs various correction processes on the digital data provided by the A/D converter 33, and provides the output unit 37 with the corrected data. As described above, the CCD clock is not provided at the timing when the data are output across the sensor chips. Thus, the image sensor 12 does not provide the A/D converter 33 with effective data. Since it is continuously provided with the operation clock, however, the A/D converter 33 produces ineffective (dummy) digital data, and provides the digital data processor 36 with the dummy data (see FIG. 3C).

Thus, the digital data processor 36 removes the data provided while the CCD clock is not being provided from the digital data provided by the A/D converter 33.

The reading controller 38 and the digital data processor 36 may be implemented by a CPU (central processing unit) being a main control unit, a ROM (read only memory) storing programs and so on, a RAM (random access memory) being a main memory configured to temporarily store data and so on, an interface configured to control input/output to/from the host and so on, and a computer having a system bus forming a communication channel among the devices. The reading controller 38 and the digital data processor 36 may be formed by ASICS (application specific integrated circuits) each of which is dedicated to a corresponding one of the processes.

Then, an operation specific to the image reading device 1 will be described with reference to flowcharts and a timing chart of the waveform.

Figure 4:
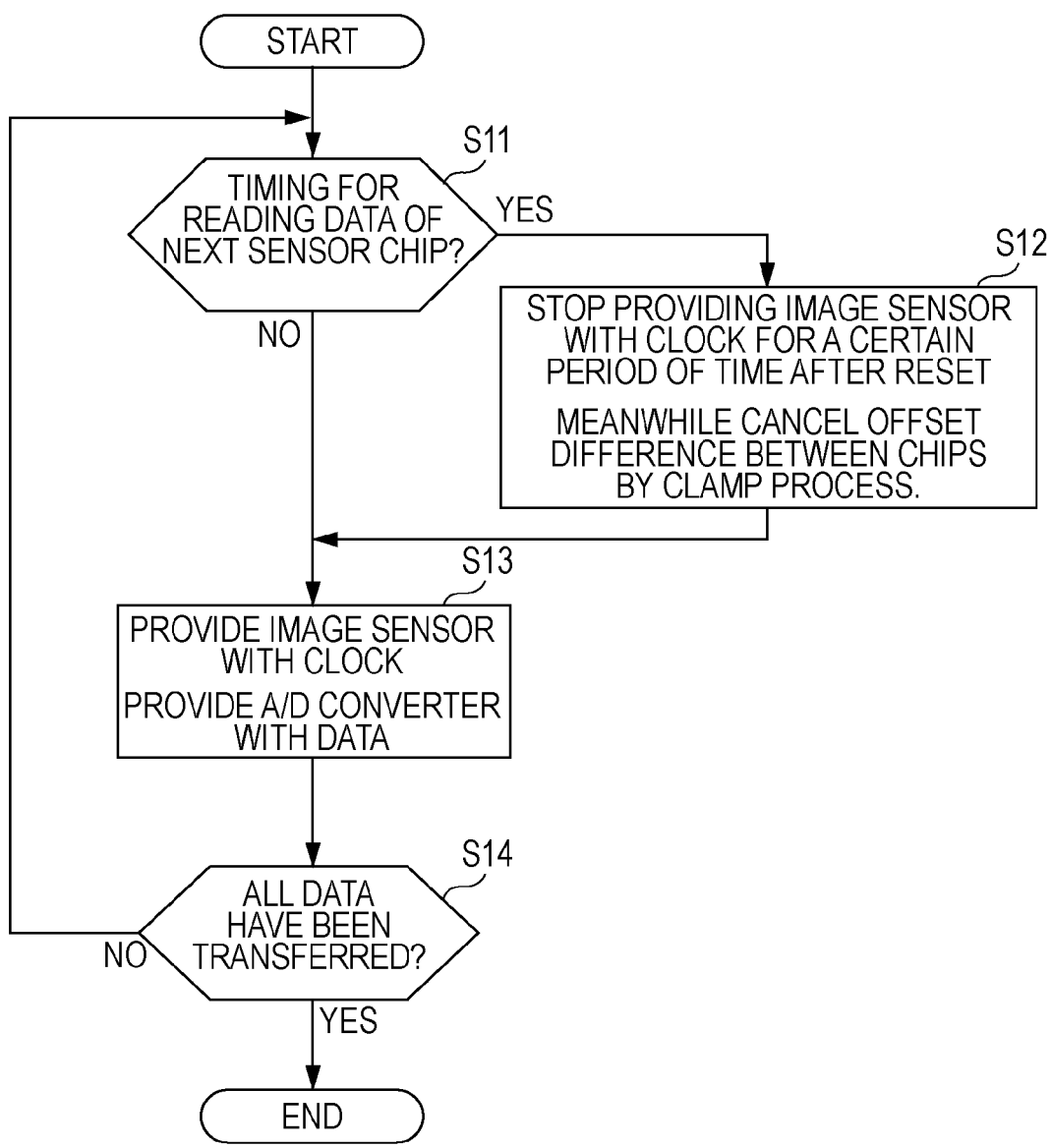
FIG. 4 is a flowchart of an operation.

FIG. 4 is a flowchart explaining a flow of the process for providing the CCD clock and an operation of the AFE 35.

The reading controller 38 determines if the timing at which data of a next sensor chip is to be read has arrived (S11). It is assumed that the time required for outputting all of the data of one sensor chip has been registered beforehand. The reading controller 38 determines whether the time required for the output has passed since starting to read the data of the N-th sensor chip, so as to determine whether the timing at which data of the (N+1)-th sensor chip is to be read, has arrived.

At the timing at which reading of the data of the next sensor chip is to be started ("Y" of S11), the reading controller 38 stops providing the CCD clock for a certain period of time. The reading controller 38 stops providing the CCD clock after the reset pulse is provided to an electric charge-to-voltage converter of the image sensor 12 for the reason described above.

While the CCD clock is not being provided, the clamp circuit 31 clamps the reference portion of the waveform of the data. As a longer period of time than usual is secured, as described above, the reference portion can be securely fixed (see FIG. 3C).

When the reading controller 38 determines that the timing at which the data of the next sensor chip is to be read has not yet arrived ("N" of S11), or after the process of S12 finishes, the reading controller 38 provides the image sensor 12 with the CCD clock so as to provide the AFE 35 with the data from the image sensor 12.

In the AFE 35, each of the circuits 31, 32 and 33 performs a process on the provided analog data.

The reading controller 38 repeats the processes of S11-S12 until the data have been transferred from all the sensor chips to the AFE 35 (S14). The flow of FIG. 4 ends after all the data have been transferred.

Then, a process of reading and discarding data of the digital data processor 36 will be explained.

Figure 5:
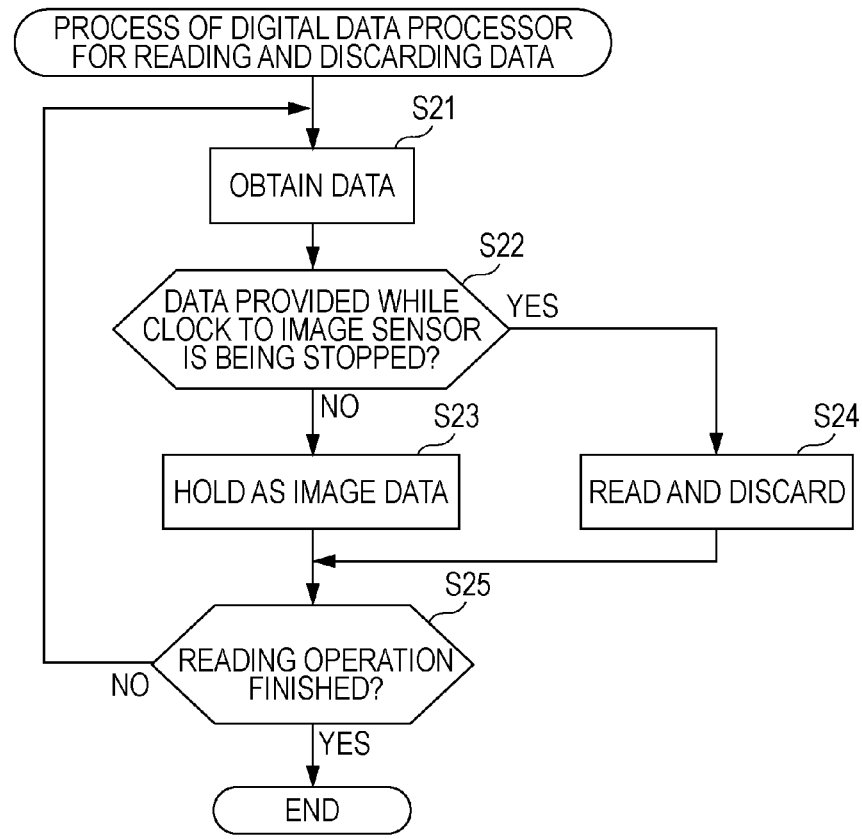
FIG. 5 is a flowchart of a process of a digital data processor for reading and discarding data.

FIG. 5 is a flowchart of the reading and discarding process. The flow starts after the image reading device 1 starts a document reading operation.

The digital data processor 36 obtains the data provided by the A/D converter 33 in order (S21). The digital data processor 36 determines whether the obtained data was provided while the CCD clock was not being provided (S22).

When the obtained digital data was not provided while the CCD clock was not being provided ("N" of S22), the digital data processor 36 holds the obtained data as effective image data (S23).

Meanwhile, for obtained digital data provided while the CCD clock was not being provided ("Y" of S22), the digital data processor 36 performs the reading and discarding process so as to remove the obtained data.

The reading controller 38 provides the digital data processor 36 with a clock indicating the period during which the CCD clock is stopped while the CCD clock is not being provided. The digital data processor 36 reads and discards the data provided by the A/D converter 33 while the above clock was being provided.

The digital data processor 36 repeats the above processes until the operation of document reading finishes (S25).

Figure 6:
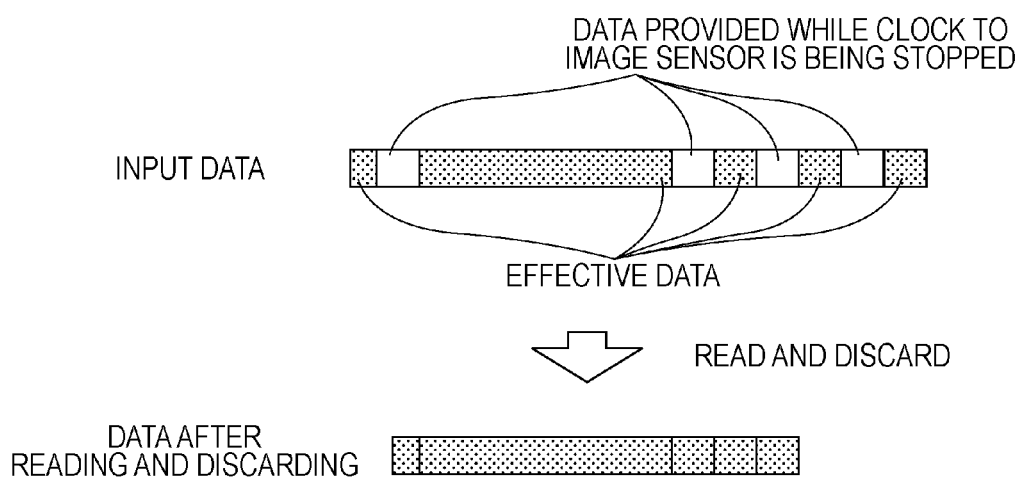
FIG. 6 illustrates a process of the digital data processor for removing ineffective data.

In this way, as shown in FIG. 6, the digital data processor 36 removes the digital data provided while the CCD clock was not being provided from the digital data provided by the A/D converter 33 so as to obtain effective image data as the image data. Then, the digital data processor 36 performs a certain correction process on the image data and provides the output unit with the image data.

The image reading device in accordance with the embodiments of the present invention has been explained as described above.

According to the embodiment described above, the image reading device having the image sensor formed by the plural sensor chips can suppress an effect of the offset difference between the sensor chips by using the above described method.

Although the CCD clock is stopped, the A/D converter continuously operates, and thus the digital data processor 36 is provided with the ineffective data. As the digital data processor 36 selects data that is effective as the image data, however, the finally output image data includes no ineffective data.

The invention is not limited to the image reading device of the CIS system, and may be applied to an image reading device of a reduced optical system.

What is claimed is:

1. An image reading system, comprising: an image sensor having a plurality of sensor chips arranged in a main scanning direction, wherein each of the sensor chips of the image sensor is configured to receive light and store electrical charges corresponding to an amount of the received light and to produce analog image data;
a controller coupled to the image sensor and configured to receive and process the analog image data from the image sensor and produce digital image data; wherein the controller comprises a reading controller that includes a clock provider configured to provide the image sensor with a first clock signal and control the timing at which the analog image data is transferred from the image sensor to the controller, and wherein the clock provider is configured to stop the first clock signal for a predetermined amount of time before each of the sensor chips output its analog image data; and a carriage housing the image sensor and configured to move along a sub-scanning direction, and a driving mechanism coupled to the carriage and the controller, wherein the driving mechanism includes a motor and an encoder configured to output pulses relative to the number of rotation of the motor; wherein rotation of the motor is controlled by the reading controller and movement of the carriage is controlled by the encoder.

2. The image reading system of claim 1, wherein the controller further comprises:
an analog front-end circuit configured to receive and process the analog image data and convert the processed analog image data into digital image data;
a digital processor coupled to the analog front-end circuit and configured to perform a correction processes on the digital image data provided by the analog front-end circuit, and
an output unit coupled to the digital processor and configured to output the data provided by the digital processor.

3. The image reading system of claim 1, wherein the controller further comprises:
an analog front-end circuit configured to receive and process the analog image data and convert the processed analog image data into digital image data;
a digital processor coupled to the analog front-end circuit and configured to perform a correction processes on the digital image data provided by the analog front-end circuit, and
an output unit coupled to the digital processor and configured to output the data provided by the digital processor.

4. The image reading system of claim 3, wherein the analog front-end circuit comprises:
a sampling circuit configured to sample a reference portion and a data portion of a part of the analog image data corresponding to a pixel, and to produce an offset difference between the reference portion and the data portion, wherein the sampling circuit is further configured to cancel the offset difference by fixing the reference portion at a constant voltage;
an amplifier circuit coupled to the sampling circuit and configured to amplify the analog image data, and
an analog to digital converter coupled to the amplifier circuit and configured to convert the analog image data into digital image data.

5. The image reading system of claim 4, wherein the predetermined amount of time for stopping the clock is a period of time needed by the sampling circuit to fix the reference portion to the constant voltage.

6. The image reading system of claim 5, wherein when the clock provider stops the first clock signal, the analog image data is not transferred to the sampling circuit, and wherein a second clock signal for the analog to digital converter circuit and a third clock signal for controlling the sampling of the reference portion and a fourth clock signal for controlling the sampling of the data portion are active and result in production of dummy data which are not related to the analog image data.

7. The image reading system of claim 6, wherein the digital data processor is configured to remove the dummy data and produce a stream of digital image data.

8. An image processing system, comprising: an image sensor having at least a first sensor chip and a second sensor chip each configured to receive light and produce image data;
a controller coupled to the image sensor and configured to read and process the image data, wherein the controller includes a clock provider configured to provide the image sensor with a driving clock and control the timing at which image data are read by the controller; wherein the clock provider is further configured to stop the driving clock of the image sensor for a period of time before the controller reads an initial part of the image data from each of the first sensor chip and the second sensor chip; and
a carriage housing the image sensor and configured to move along a sub-scanning direction, and a driving mechanism coupled to the carriage and the controller, wherein the driving mechanism includes a motor and an encoder configured to output pulses relative to the number of rotation of the motor; wherein rotation of the motor is controlled by the reading controller and movement of the carriage is controlled by the encoder.

9. The image processing system of claim 8, wherein the controller further comprises:
a digital data processor configured to remove the image data read during the period of time which the clock provider stops the driving clock of the image sensor.

10. The image processing system of claim 8, wherein the controller further includes a sampling circuit configured to sample a reference portion and a data portion of a part of the image data corresponding to a pixel, and to produce an offset difference between the reference portion and the data portion, wherein the sampling circuit is further configured to cancel the offset difference by fixing the reference portion at a constant voltage.

11. The image processing system of claim 8, wherein the clock provider is further configured to generate a plurality of additional driving clocks for controlling different stages of processing the image data.

12. The image processing system of claim 8, wherein the controller is configured to determine when an initial part of the image data of each of the first and second sensor chips has arrived.

13. The image processing system of claim 8, wherein the first sensor chip and the second sensor chip are arranged in a main scanning direction and the image sensor is configured to move along a sub-scanning direction.

14. The image processing of claim 8, wherein the clock provider is further configured to top providing the clock in a way that a period of a references portion of a waveform of the image data of the first sensor chip corresponding to a pixel is longer than that of a reference portion of a waveform of the second sensor chip.

15. A method for reading and processing an image, comprising: receiving light and producing analog image data using a plurality of sensor chips; receiving and processing the analog image data from the sensor chips and producing digital image data using a controller; controlling the timing at which the analog image data is transferred from the image sensor to a controller using a clock signal provided by a clock provider, stopping the clock signal for a predetermined amount of time before each of the sensor chips output its analog image data; and further comprising: a carriage housing the image sensor and configured to move along a sub-scanning direction, and a driving mechanism coupled to the carriage and the controller, wherein the driving mechanism includes a motor and an encoder configured to output pulses relative to the number of rotation of the motor; wherein rotation of the motor is controlled by the reading controller and movement of the carriage is controlled by the encoder.

16. The method of claim 15 further comprising:
sampling a reference portion and a data portion part of the analog image data corresponding to a pixel, and producing an offset difference between the reference portion and the data portion using a sampling circuit.

17. The method of claim 16 further comprising:
canceling the offset difference by fixing the reference portion at a constant voltage using the sampling circuit.

18. The method of claim 15 further comprising:
using an image processing system, removing the digital image data read during the period of time which the clock provider stops the clock signal.

19. An image processing system, comprising: an image sensor having a plurality of sensor chips arranged in a main scanning direction, wherein each of the sensor chips of the image sensor is configured to receive light and store electrical charges corresponding to an amount of the received light and to produce analog image data;
a controller coupled to the image sensor and configured to receive and process the analog image data from the image sensor and produce digital image data; wherein the controller comprises a reading controller that includes a clock provider configured to provide the image sensor with a first clock signal and control the timing at which the analog image data is transferred from the image sensor to the controller, and wherein the clock provider is configured to stop the first clock signal for a predetermined amount of time before each of the sensor chips output its analog image data;
digital processor housed by the controller and configured to perform a correction processes on the digital image data,
an output unit coupled to the digital processor and configured to output the data provided by the digital processor; wherein the digital processor is further configured to remove the digital image data read during the predetermined amount of time which the clock provider stops the first clock signal processor, and
a carriage housing the image sensor and configured to move along a sub-scanning direction, and a driving mechanism coupled to the carriage and the controller, wherein the driving mechanism includes a motor and an encoder configured to output pulses relative to the number of rotation of the motor; wherein rotation of the motor is controlled by the reading controller and movement of the carriage is controlled by the encoder.

* * * * *